US012665457B2

(12) United States Patent
Bickel et al.

(10) Patent No.: US 12,665,457 B2
(45) Date of Patent: Jun. 23, 2026

(54) ARRANGEMENT OF A CONTACT ELEMENT ON FREE COIL CONDUCTOR ENDS OF AN ELECTRIC MACHINE, ELECTRIC MACHINE FOR A MOTOR VEHICLE, METHOD FOR PROVIDING A CONTACT ELEMENT FOR AN ELECTRIC MACHINE, AND MOTOR VEHICLE

(71) Applicant: Bayerische Motoren Werke Aktiengesellschaft, Munich (DE)

(72) Inventors: Benjamin Bickel, Nuremberg (DE); Daniel Winkle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 18/035,395

(22) PCT Filed: Nov. 11, 2021

(86) PCT No.: PCT/EP2021/081310
§ 371 (c)(1),
(2) Date: May 4, 2023

(87) PCT Pub. No.: WO2022/128269
PCT Pub. Date: Jun. 23, 2022

(65) Prior Publication Data
US 2023/0412025 A1 Dec. 21, 2023

(30) Foreign Application Priority Data
Dec. 14, 2020 (DE) .................... 10 2020 133 274.2

(51) Int. Cl.
H02K 3/28 (2006.01)
H02K 3/38 (2006.01)
H02K 15/33 (2025.01)

(52) U.S. Cl.
CPC ................. *H02K 3/28* (2013.01); *H02K 3/38* (2013.01); *H02K 15/33* (2025.01); *H02K 2203/09* (2013.01)

(58) Field of Classification Search
CPC ............ H02K 3/28; H02K 3/50; H02K 3/505; H02K 2203/09
(Continued)

(56) References Cited

U.S. PATENT DOCUMENTS

2009/0127948 A1 5/2009 Shimizu et al.
2013/0076176 A1 3/2013 Edrington et al.
(Continued)

FOREIGN PATENT DOCUMENTS

DE 11 2012 002 959 T5 4/2014
DE 10 2016 225 503 A1 6/2018
(Continued)

OTHER PUBLICATIONS

WO-2018091295-A1 machine translation (Year: 2018).*
(Continued)

*Primary Examiner* — Minki Chang
(74) *Attorney, Agent, or Firm* — Crowell & Moring LLP

(57) ABSTRACT

An arrangement of a contact element on free coil conductor ends of an electric machine is provided. At least one coil conductor end is inserted into an insertion opening of an assigned contact sleeve on the contact element and is welded to the contact sleeve. The contact element is configured to connect at least two coil conductor ends and/or electrically connect the at least one coil conductor end to at least one phase conductor, and the at least one coil conductor end lies against a wall which delimits the insertion opening of the contact sleeve on the inside over the entire circumference of
(Continued)

the coil conductor end at least in a longitudinal region in the insertion direction of the coil conductor end into the contact sleeve.

8 Claims, 2 Drawing Sheets

(58) Field of Classification Search
USPC .......................................................... 310/71
See application file for complete search history.

(56)                       References Cited

U.S. PATENT DOCUMENTS

| | | | | |
|---|---|---|---|---|
| 2014/0183985 A1* | 7/2014 | Kurahara | ................. | H02K 3/38 |
| | | | | 29/596 |
| 2018/0097416 A1 | 4/2018 | Dang | | |
| 2019/0372433 A1 | 12/2019 | Sewiolo | | |
| 2020/0368969 A1 | 11/2020 | Wang et al. | | |
| 2021/0249915 A1* | 8/2021 | Degner | ................. | H02K 1/165 |

FOREIGN PATENT DOCUMENTS

| | | | | |
|---|---|---|---|---|
| DE | 10 2018 009 206 B3 | 3/2020 | | |
| DE | 10 2018 219 536 A1 | 5/2020 | | |
| EP | 0 751 609 A2 | 1/1997 | | |
| EP | 3 364 524 A1 | 8/2018 | | |
| JP | 2011-114979 A | 6/2011 | | |
| WO | WO-2018091295 A1 * | 5/2018 | ......... | H02K 15/0062 |
| WO | WO-2020210855 A1 * | 10/2020 | ............. | H02K 15/35 |

OTHER PUBLICATIONS

WO-2020210855-A1 Machine translation (Year: 2020).*
International Search Report (PCT/ISA/210) issued in PCT Application No. PCT/EP2021/081310 dated Feb. 25, 2022 with English translation (five (5) pages).
German-language Written Opinion (PCT/ISA/237) issued in PCT Application No. PCT/EP2021/081310 dated Feb. 25, 2022 (eight (8) pages).
German-language Search Report issued in German Application No. 10 2020 133 274.2 dated Nov. 9, 2021 with partial English translation (13 pages).

* cited by examiner

ARRANGEMENT OF A CONTACT ELEMENT ON FREE COIL CONDUCTOR ENDS OF AN ELECTRIC MACHINE, ELECTRIC MACHINE FOR A MOTOR VEHICLE, METHOD FOR PROVIDING A CONTACT ELEMENT FOR AN ELECTRIC MACHINE, AND MOTOR VEHICLE

BACKGROUND AND SUMMARY OF THE INVENTION

The invention relates to an arrangement of a contact element on free coil conductor ends of an electric machine, to an electric machine for a motor vehicle, to a method for providing a contact element for an electric machine, and to a motor vehicle.

A device for interconnecting a wiring of a stator is already known from WO 2018/091295 A1. This device comprises a main body, the underside of which can be placed on an end face of the stator. The main body comprises a plurality of positioning devices that have interconnection portions realized as sleeves. Each sleeve of the positioning devices is designed to receive respectively two electrical conductors of the wiring of the stator. For the purpose of interconnecting the wiring, the two electrical conductors arranged in each of the interconnection portions are connected to each other in a materially bonded or form-fitting manner by way of the part of the respective sleeve that forms the interconnection portion.

The object of the present invention is to enable coil conductor ends of an electric machine to be contacted to a contact element in a particularly secure and uncomplicated manner over a large surface area.

This object is achieved according to the claimed invention.

The invention relates to an arrangement of a contact element on free coil conductor ends of an electric machine. This contact element may be part of a connector assembly via which an electrical contact, between respective coil conductors of the electric machine that comprise the coil conductor ends, can be effected, to each other and/or to respective phase conductors. In particular, the contact element may be in the form of a partial ring or a circular ring, and thus realized as a contact ring. The electric machine is in particular an electric motor of a motor vehicle. The coil conductors in this case may in particular be part of a stator of the electric machine. To enable the contact element to be connected to the free coil conductor ends of the electric machine, it is provided in the arrangement that at least one coil conductor end is inserted into an insertion opening of an assigned contact sleeve of the contact element and is welded to the contact sleeve. In this case, both the coil conductor ends and the at least one contact sleeve assigned to the respective coil conductor end are made of an electrically conductive material. Thus, the at least one coil conductor end and the assigned contact sleeve are connected to each other in a materially bonded manner, enabling the at least one coil conductor end to be held on the assigned contact sleeve in a particularly secure manner. A contact sleeve in the present context is understood to be a hollow profile. The contact sleeve is thus a solid body that has an opening, in this case the insertion opening, which may have a round and/or angular cross-section. It is furthermore provided in the arrangement that the contact element is configured to interconnect at least two coil conductor ends and/or to connect the at least one coil conductor end to at least one phase conductor in an electrically conductive manner. In this way, the contact element enables the coil conductors to be electrically connected to each other, or enables the coil conductors to be electrically connected to an electrical load. In order for the coil conductor end inserted into the insertion opening to be held in a particularly secure manner by the contact sleeve, it is provided in the arrangement that the at least one coil conductor end bears over its entire circumference, in a longitudinal region of a direction of insertion of the coil conductor end into the assigned contact sleeve, against the inside of a wall that delimits the insertion opening of the contact sleeve. In particular, the at least one coil conductor end already bears over its entire circumference, in the longitudinal region of the direction of insertion, against the inside of the wall in particular before the contact sleeve is connected in a materially bonded manner to the coil conductor end. The greater the longitudinal region in the direction of insertion over which the coil conductor end bears, over its entire circumference, against the wall that delimits the insertion opening of the contact sleeve, the more stable is the connection between the contact sleeve and the at least one coil conductor end inserted into the contact sleeve, and the better is the efficiency of electrical transmission between the contact sleeve and the coil conductor end inserted into the contact sleeve.

In a development of the invention, it is provided that a cross-section of the insertion opening and a cross-section of the coil conductor end inserted into the insertion opening have the same basic geometric shape. The cross-section of the insertion opening is aligned parallel to the cross-section of the coil conductor end inserted into the insertion opening. The cross-section of the coil conductor end inserted into the insertion opening and the cross-section of the insertion opening are geometrically similar to each other due to their same basic geometric shape. This means that the cross-section of the insertion opening constitutes a similarity transformation of the cross-section of the coil conductor end inserted into the insertion opening. Thus, the angular and linear relationships of the cross-section of the insertion opening are at least substantially the same as the cross-section of the coil conductor end inserted into the insertion opening. In other words, the insertion opening and the coil conductor end inserted into the insertion opening have cross-sections that match each other. In particular, it is provided that the cross-section of the insertion opening and the cross-section of the coil conductor end inserted into the insertion opening have the same basic geometric shape in the longitudinal region of the direction of insertion in which the coil conductor end bears, over its entire circumference, against the inside against the wall that delimits the insertion opening of the contact sleeve. Due to the insertion opening and of the coil conductor end inserted into the insertion opening being designed such that they have mutually complementary cross-sections and the same basic geometric shape, it becomes possible for the coil conductor end to bear over its entire circumference, in the longitudinal region, against the inside of the wall that delimits the insertion opening of the contact sleeve.

In a further design of the invention, it is provided that a cross-section of the insertion opening and a cross-section of the coil conductor end inserted into the insertion opening are of a basic rectangular shape. In particular, if the coil conductor is formed from at least two hairpin windings, also referred to as so-called hairpins, of a so-called hairpin stator, or a so-called hairpin rotor, that are connected to each other in a materially bonded manner, the coil conductor end can be formed particularly easily with the basic rectangular shape. If the cross-section of the respective hairpin windings is of a basic rectangular shape, then the cross-section of the coil conductor end formed by laying the hairpin windings side by side also results in a basic rectangular shape, which is in particular at least substantially without discontinuities or slits. The basic rectangular shape of the cross-section of the coil conductor end can be achieved particularly easily, by laying at least two hairpin windings of the electric machine side by side and joining them in a materially bonded manner. Configuring the cross-section of the insertion opening so that it, likewise, is of the basic rectangular shape enables the coil conductor end to bear particularly securely over its entire circumference, in the longitudinal region, against the inside of the wall that delimits the insertion opening. Furthermore, the basic rectangular shape can be achieved particularly easily by laying at least two hairpin windings side by side. The basic rectangular shape thus enables the hairpin windings connected to the coil conductor end to be connected particularly securely to the contact sleeve.

In a further design of the invention, it is provided that the at least one coil conductor end tapers toward its free end. In particular, the at least one coil conductor end may have a pyramid-shaped vertex, in particular in the case of the cross-section of the coil conductor end being of the basic rectangular shape. The tapering of the at least one coil conductor end, along the direction of insertion, toward its free end enables the at least one coil conductor end to be centered within the insertion opening when the coil conductor end is inserted into the insertion opening in the direction of insertion. This makes it particularly easy to align the coil conductor end within the contact sleeve, relative to the wall that delimits the insertion opening, in order to ensure that the coil conductor end bears securely in the longitudinal region, over the entire circumference of the coil conductor end, against the wall that delimits the insertion opening.

In a further design of the invention, it is provided that the insertion opening has a taper in the direction of insertion. This means that the cross-section of the insertion opening tapers in the direction of insertion and thus becomes smaller. The taper of the cross-section of the insertion opening in the direction of insertion enables centering of the coil conductor end inserted into the insertion opening in the direction of insertion when the coil conductor end is being inserted into the insertion opening. The centering of the coil conductor end along the tapered cross-section of the insertion opening in the direction of insertion makes it possible, when the coil conductor end is being inserted into the contact sleeve, for the coil conductor end to bear securely over its entire circumference, in the longitudinal region, against the wall that delimits the insertion opening.

In a further design of the invention, it is provided that the contact element has a plurality of contact sleeves that are surrounded, at least in regions, by an electrically insulating material. In particular, the contact sleeves may be over-moulded by the electrically insulating material and/or cast into the electrically insulating material. By way of the electrically insulating material, a short-circuit between respective contact sleeves of the contact element can be at least substantially avoided. This allows the electric machine comprising the contact element to be operated in a particularly safe manner.

In a development of the invention, it is provided that the contact sleeves are electrically connected to each other via additively manufactured strip conductors. In particular, both the contact sleeves and the strip conductors may be produced by additive manufacture, in particular produced together by additive manufacture. For example, the contact sleeves and the strip conductors may be manufactured generatively by selective laser melting or selective laser sintering. The additive manufacturing of the strip conductors enables the contact sleeves to be connected in a particularly precise manner, thus making it possible to implement complicated interconnections of the contact sleeves.

The invention furthermore relates to an electric machine for a motor vehicle, comprising a laminated core having a plurality of slots, arranged in which there is at least one coil conductor. The respective coil conductor in this case may comprise, for example, one or more hairpin windings, also referred to as so-called hairpins. Furthermore, the electric machine comprises a contact element that is arranged at a front end of the electric machine and that is electrically connected to at least one coil conductor end of a coil conductor in an arrangement as already described in connection with the arrangement according to embodiments of the invention. The contact element comprises, in particular, a plurality of contact sleeves, each contact sleeve having an insertion opening. The respective coil conductor ends are inserted into the contact sleeves of the contact element in a direction of insertion. The respective coil conductor ends have cross-sections that are complementary to the respective cross-sections of the assigned contact sleeves. As a result, the respective coil conductor ends in each case bear, in at least a longitudinal region along the direction of insertion of the respective coil conductor end into the assigned contact sleeve, over their full circumference, against the inside of a respective wall that delimits the respective insertion opening of the contact sleeve. This allows the respective coil conductor ends to be connected particularly securely in a materially bonded manner to the assigned contact sleeves by way of respective welded connections.

The invention may furthermore comprise a stator for an electric machine of a motor vehicle, comprising a stator laminated core having a plurality of slots, arranged in each of which there is at least one coil conductor. Furthermore, the stator comprises a contact element that is arranged at a front end of the stator and that is electrically connected to at least one coil conductor end of a coil conductor of the stator in an arrangement as already described in connection with the arrangement according to embodiments of the invention. Advantages and advantageous developments of the arrangement according to embodiments of the invention are to be regarded as advantages and advantageous developments of the electric machine according to embodiments of the invention and of the stator according to embodiments of the invention, and vice versa.

Furthermore, the invention includes a method for providing a contact element for an electric machine, in which at least one contact sleeve, into which a coil conductor end of the electric machine can be inserted and which can be welded to the coil conductor end, and at least one strip conductor that electrically contacts the contact sleeve, are manufactured generatively and are embedded, at least in regions, in an electrically insulating material. The electric machine is in particular an electric machine as already described in connection with the electric machine according to embodiments of the invention. Via the at least one strip conductor, the at least one contact sleeve can be electrically contacted to a further contact sleeve of the contact element or to a phase conductor. If the respective strip conductor connects two contact sleeves to each other, then the strip conductor serves to connect to each other, or interconnect, respective coil conductors of which the coil conductor ends are inserted into the contact sleeves. If the strip conductor connects the at least one contact sleeve to the phase conductor, then the at least one contact sleeve can be electrically contacted to an electrical load via the phase conductor. In particular, the contact element comprises a plurality of contact sleeves and a plurality of strip conductors by way of which the contact sleeves are interconnected to each other and/or can be connected in an electrically conductive manner to the at least one phase conductor. The generative manufacturing of the at least one contact sleeve and the at least one strip conductor of the contact element makes it particularly easy to form complicated interconnections of the contact sleeves to one other and/or to at least one phase conductor. Furthermore, the generative manufacturing method allows the at least one strip conductor to be formed with a particularly small cross-section, and thus with the use of a particularly small amount of material.

In a development of the present invention, it may be provided that the at least one contact sleeve and the at least one strip conductor are overmoulded with the electrically insulating material. The electrically insulating material may in particular be a plastic. For the purpose of overmoulding the at least one contact sleeve and the at least one strip conductor, the plastic may be injection-molded onto the at least one contact sleeve and the at least one strip conductor. Alternatively or in addition to the overmoulding with the electrically insulating material, the at least one contact sleeve and the at least one strip conductor may be encapsulated by the insulating material, or integrally cast by the electrically insulating material. By way of the electrically insulating material, contact sleeves of the contact element can be electrically insulated from each other, or from strip conductors of the contact element, and strip conductors of the contact element can be electrically insulated from each other, thereby enabling a short-circuit, or an incorrect connection, of the electric machine to be at least substantially avoided. Moreover, the electrically insulating material may serve to fix the at least one contact sleeve and the at least one strip conductor to each other, or to further contact sleeves and/or further strip conductors. The electrically insulating material may thus serve to stabilize the contact element. The at least partial encasing of the at least one contact sleeve and of the at least one strip conductor of the contact element thus provides for particularly safe operation of an electric machine that comprises the contact element.

The invention furthermore relates to a motor vehicle having an electric machine as already described in connection with the electric machine according to embodiments of the invention.

Further features of the invention can be found in claims, the figures and the description of the figures. The features and combinations of features mentioned above in the description, as well as the features and combinations of features mentioned below in the description of figures and/or shown in the figures alone, are applicable not only in the combination indicated in each case, but also in other combinations or on their own without departure from the scope of the invention.

DETAILED DESCRIPTION OF THE DRAWINGS

In the figures, elements that are the same, and elements that have the same function, are denoted by the same references.

Figure 1:
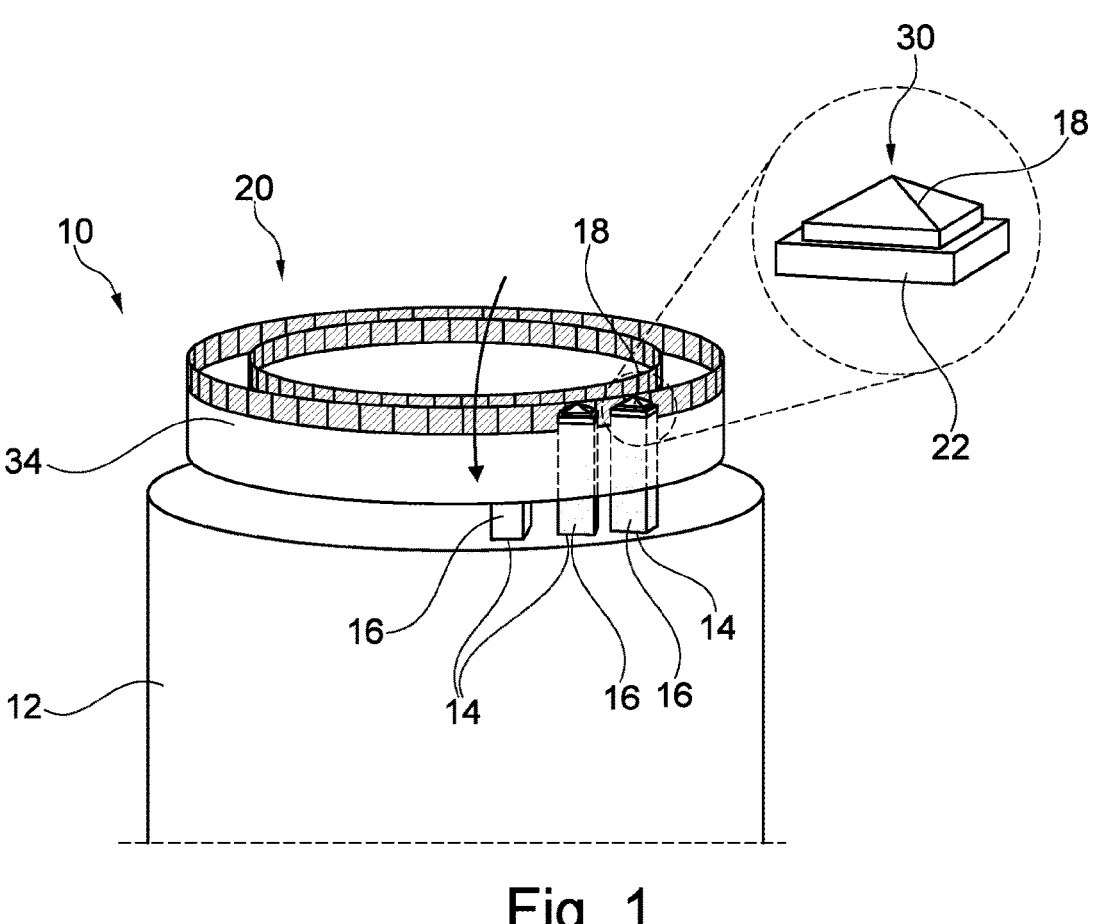
FIG. 1 shows a schematic perspective view of an arrangement of a contact element on free coil conductor ends of an electric machine, in which the free coil conductor ends are inserted into respective assigned contact sleeves of the contact element in a direction of insertion, as a result of which the free coil conductor ends bear over their entire circumference, at least in a longitudinal region along the direction of insertion, against the inside a wall that delimits the respective insertion opening of the assigned contact sleeve.

FIG. 1 shows a perspective view of part of a stator 10 of an electric machine. By way of the electric machine, electrical energy can be converted into mechanical energy or mechanical energy can be converted into electrical energy. In the present case, the electric machine is an electric engine of a motor vehicle. Thus, the motor vehicle can be driven by way of the electric machine.

The stator 10 shown in FIG. 1 comprises a laminated core 12 that has a plurality of slots 14. At least one hairpin winding 16, which is electrically conductive, is arranged as a stator winding in each slot 14. Respective coil conductors of the stator 10 may be formed by at least one hairpin winding 16 alone or at least two hairpin windings 16 connected to each other in a materially bonded manner. Each coil conductor has a free coil conductor end 18 that protrudes beyond the laminated core 12.

To enable the hairpin windings 16 to be interconnected in correct phase, the coil conductor ends 18 are to be connected, or electrically contacted, to a stator connector assembly. As can be seen in FIG. 1, the coil conductor ends 18 are electrically contacted to a contact element 20 of the stator connector assembly. The stator connector assembly forms an interface between electronics, in particular electronics of the motor vehicle, and the stator 10. In the embodiment shown in FIG. 1, the contact element 20 is realized as a contact ring. In this case, the contact element 20 has a particularly high inherent stiffness. The contact element 20 shown in FIG. 1 is a switching ring for contacting the windings of the electric machine.

Figures 2A, 2B:
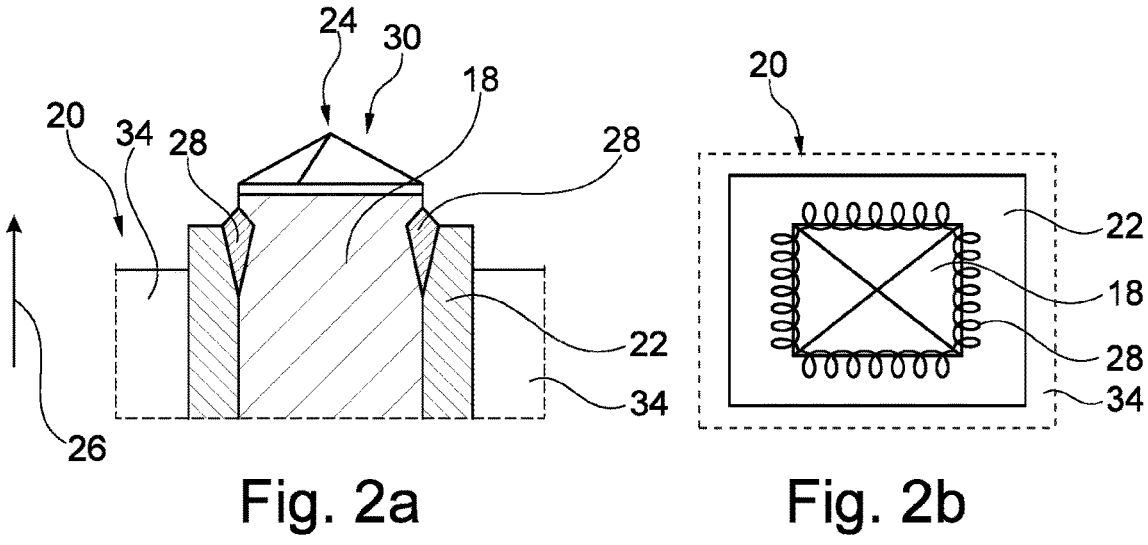
FIGS. 2a and 2b show a longitudinal section and a top view of a free coil conductor end inserted into a contact sleeve of the contact element, both the coil conductor end and the insertion opening of the contact sleeve having a rectangular cross-section, and the free coil conductor end being welded circumferentially to the contact sleeve.

The contact element 20 comprises at least one contact sleeve, in this case a plurality of contact sleeves 22. The contact sleeves 22 are made of an electrically conductive material. Each contact sleeve 22 has an insertion opening 24 into which a respectively assigned coil conductor end 18 can be inserted in a direction of insertion 26, as is particularly clearly visible in FIG. 2a. For a particularly secure connection of the respective coil conductor end 18 to the contact sleeve 22, into the insertion opening 24 of which the coil conductor end 18 is inserted, it is provided in the present case that the coil conductor end 18 is welded to the contact sleeve 22 by way of a welded connection. To enable the respective coil conductor end 18 to be connected in a particularly secure manner to the assigned contact sleeve 22, it is provided that respective gaps between the coil conductor end 18 and a wall of the assigned contact element 20 that delimits the insertion opening 24 are as small as possible, thereby enabling a particularly high-quality weld seam 28 to be obtained.

For the purpose of arranging the respective coil conductor end 18 in the insertion opening 24 of the assigned contact sleeve 22 with particularly small distances between the coil conductor end 18 and respective walls of the contact sleeve 22 that delimit the insertion opening 24, it is provided that the coil conductor end 18 and the insertion opening 24 of the contact sleeve 22 assigned to the coil conductor end 18 have cross-sections that correspond to each other in their shape. This means that the cross-section of the insertion opening 24 and the cross-section of the coil conductor end 18 have the same basic geometric shape, by which it is to be understood that the cross-section of the insertion opening 24 is a similarity transformation of the cross-section of the coil conductor end 18. Thus, the cross-section of the coil conductor end 18 and the cross-section of the assigned insertion opening 24 have the same angles as well as the same line ratios. Here, both the cross-section of the coil conductor end 18 and the cross-section of the insertion opening 24 are rectangular, as is particularly clearly visible in FIG. 2*b*. This enables the coil conductor end 18 to bear over a particularly large surface area against the walls of the assigned contact sleeve 22 that delimit the insertion opening 24. Via the particularly large contact surface areas, the coil conductor end 18 and the assigned contact sleeve 22 can be connected to each other in a particularly secure manner by a material bond. Due to the matched cross-sections of the coil conductor end 18 and of the insertion opening 24 of the assigned contact sleeve 22, the coil conductor end 18, when having been inserted into the assigned contact sleeve 22, bears over its entire circumference, at least in a longitudinal region along the direction of insertion 26, against the inside of the walls of the contact sleeve 22 that delimit the insertion opening 24. The basic rectangular shape for the cross-section of the insertion opening 24 and the cross-section of the coil conductor end 18 inserted into the insertion opening 24 enables free spaces to be kept particularly small, thereby making it possible to achieve a particularly high slot fill factor for windings of the stator 10.

In the present case, the respective coil conductor end 18 extends through the assigned contact sleeve 22 when the contact element 20 is arranged at the front end of the stator 10. This makes it possible to achieve a particularly large area of surface contact, along the direction of insertion 26, between the coil conductor end 18 and the wall of the contact sleeve 22 that delimits the insertion opening 24.

To enable the movement of the coil conductor end 18 to be guided when this coil conductor end 18 is being inserted, in the direction of insertion 26, into the insertion opening 24 of the contact sleeve 22, the coil conductor end 18 in the present case is provided with a taper 30. Thus, the coil conductor end 18 is tapered toward its free end. This taper 30 may in particular serve as an insertion slope when the coil conductor end 18 is being inserted into the insertion opening 24. The taper 30 in the present case is formed by a pyramid vertex of the free end of the free coil conductor end 18. In order that a particularly advantageous centering of the coil conductor end 18 in the insertion opening 24 can be achieved when the coil conductor end 18 is being inserted in the direction of insertion 26, it is provided in the present case that the insertion opening 24 tapers in the direction of insertion 26. This means that the cross-section of the insertion opening 24 becomes ever smaller in the direction of insertion 26. As a result, the coil conductor end 18 and the contact sleeve 22 can be guided particularly easily relative to each other when the coil conductor end 18 is being inserted into the insertion opening 24, and thus positioned relative to each other. This enables the coil conductor end 18 to bear over its entire circumference, at least in the longitudinal region of the direction of insertion 26, against the inside of the wall that delimits the insertion opening 24 of the contact sleeve 22. The conical insertion opening 24, due to its taper in the direction of insertion 26, enables the contact element 20 to be placed axially in an automated manner onto the coil conductor ends 18 of the electric machine.

In the present case, the contact element 20 has a plurality of contact sleeves 22 that are configured to interconnect at least two coil conductor ends 18 and/or to connect the at least one coil conductor end 18 to at least one phase conductor in an electrically conductive manner. For the purpose of connecting the at least two coil conductor ends 18, the contact element 20 has at least one strip conductor 32 that is electrically connected, in particular directly contacted, to the contact sleeves 22 assigned to the coil conductor ends 18 to be electrically connected. Furthermore, the at least one strip conductor 32 may connect at least one of the contact sleeves 22 of the contact element 20 to the phase conductor in an electrically conductive manner. To enable the at least one strip conductor 32 and the contact sleeves 22 to be positioned particularly securely relative to each other, it is provided that the contact sleeves 22 and the at least one strip conductor 32 are embedded, at least in regions, in an electrically insulating material 34. The electrically insulating material 34 in the present case is a plastic. This electrically insulating material 34 may in particular be molded onto the contact sleeves 22 and the at least one strip conductor 32, in particular in an injection molding process. Alternatively, the contact sleeves 22 and the at least one strip conductor 32 may be encapsulated by the electrically insulating material 34.

Figure 3:
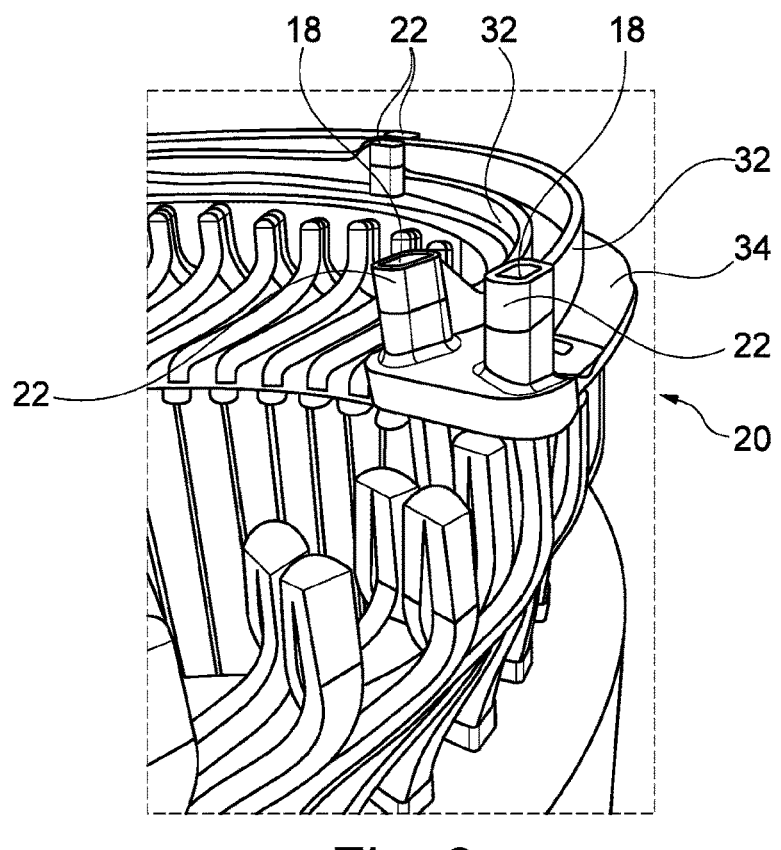
FIG. 3 shows a perspective view of an arrangement of a contact element, in the form of a partial ring, on the free coil conductor ends of the electric machine, in which the contact element have a plurality of contact sleeves that are connected to each other transversely via strip conductors, and in which there is an electrically insulating casting compound molded onto the contact sleeves and the strip conductors in order to impart a particularly high degree of stability to the contact element.
Figure 4:
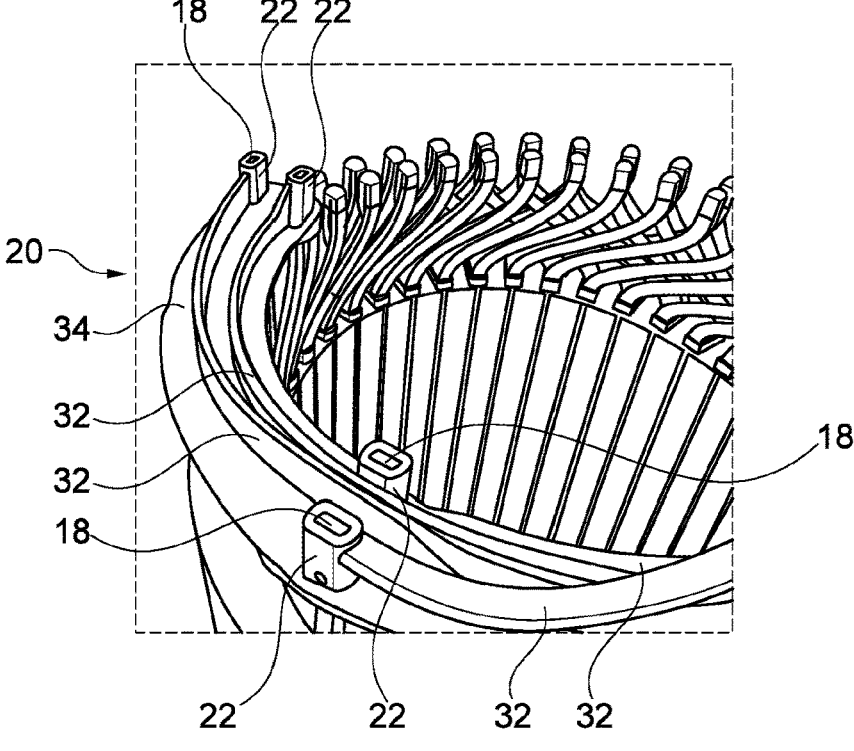
FIG. 4 shows a further perspective view of the arrangement according to FIG. 3, the respective coil conductor ends being formed by hairpin windings, also referred to as so-called hairpins, that are connected to each other in a materially bonded manner.

FIGS. 3 and 4 show part of the electric machine, the contact element 20 arranged at the front end being realized in the form of a partial ring. As is particularly clearly visible in FIGS. 3 and 4, the contact element 20 has a plurality of contact sleeves 22, into each of which a coil conductor end 18 is inserted in the direction of insertion 26 and welded to the assigned contact sleeve 22. Furthermore, the strip conductors 32, which are electrically contacted with the contact sleeves 22, are particularly clearly visible in FIGS. 3 and 4. In the present case, the contact sleeves 22 and the strip conductors 32 are produced by generative manufacture, in particular from copper. After having been produced by additive manufacture, the strip conductors 32 and the contact sleeves 22 may be encapsulated by the electrically insulating material 34, at least in regions.

In the case of a method for providing the contact element 20 for the electric machine, it is thus provided that the at least one contact sleeve 22, in particular the plurality of contact sleeves 22, and the at least one strip conductor 32 electrically contacting the at least one contact sleeve 22, or the plurality of contact sleeves 22, are manufactured generatively and embedded, at least in regions, in the electrically insulating material 34. As an alternative to encapsulating the contact sleeves 22, or the strip conductors 32, in the electrically insulating material 34, in the method for providing the contact element 20 the at least one contact sleeve 22 and the at least one strip conductor 32 may be overmoulded with the electrically insulating material 34 in an injection molding process.

The provision of the at least one contact sleeve 22 by way of the generative manufacturing process enables a geometry of the cross-section of the insertion opening 24 to be set in a particularly precise manner, thereby allowing the geometry of the cross-section of the insertion opening 24 to be particularly well matched to the geometry of the cross-section of the coil conductor end 18 that is to be inserted into the insertion opening 24. This makes it possible to achieve a particularly large contact surface between the coil conductor ends 18 and the respective wall of the assigned contact sleeve 22 that delimits the insertion opening 24, thereby enabling the coil conductor end 18 to be welded particularly easily to the contact sleeve 22, in particular with a particularly large permissible vertical offset, in particular in an order of magnitude of approximately 1 mm. In this way, a risk of hotspots can be kept particularly low due to the particularly large contact surface. The fact that the coil conductor end 18 bears over its entire circumference against the inside against the wall that delimits the insertion opening 24 of the contact sleeve 22 means that welding surface is available over the entire circumference of the coil conductor end 18 for welding the coil conductor end 18 to the contact sleeve 22.

The arrangement described makes it possible to implement particularly small gap dimensions between the coil conductor end 18 and the wall of the contact sleeve 22 that delimits the insertion opening 24. This makes it possible to achieve a particularly high quality of interfacing between the coil conductor end 18 and the assigned contact sleeve 22.

Overall, the invention shows how axial tolerance compensation of a front-end laser welded connection can be provided in an electric machine.

LIST OF REFERENCES

10 stator
12 laminated core
14 slot
16 hairpin winding
18 coil conductor end
20 contact element
22 contact sleeve
24 insertion opening
26 direction of insertion
28 weld seam
30 taper
32 strip conductor
34 electrically insulating material

The invention claimed is:

1. An arrangement comprising:
a contact element on free coil conductor ends of an electric machine, wherein:

at least one coil conductor end is inserted into an insertion opening of an assigned contact sleeve of the contact element and is welded to the assigned contact sleeve,
the contact element is configured to interconnect at least two coil conductor ends in an electrically conductive manner,
the at least one coil conductor end bears over its entire circumference, in a longitudinal region of a direction of insertion of the at least one coil conductor end into the assigned contact sleeve, against an inside of a wall that delimits the insertion opening of the assigned contact sleeve,
the at least one coil conductor end has a first taper that is formed by a pyramid vertex of its free end, and
the insertion opening has a second taper in the direction of insertion.

2. The arrangement according to claim 1, wherein:
a cross-section of the insertion opening and a cross-section of the at least one coil conductor end inserted into the insertion opening have a same geometric shape.

3. The arrangement according to claim 1, wherein:
a cross-section of the insertion opening and a cross-section of the at least one coil conductor end inserted into the insertion opening are of a rectangular shape.

4. The arrangement according to claim 1, wherein:
the contact element has a plurality of contact sleeves that are surrounded, at least in regions, by an electrically insulating material, and
the plurality of contact sleeves includes the assigned contact sleeve.

5. The arrangement according to claim 4, wherein:
the plurality of contact sleeves are electrically connected to each other via additively manufactured strip conductors.

6. The electric machine comprising:
a laminated core having a plurality of slots, arranged in each of which is at least one coil conductor, and
the contact element that is arranged at a front end of the electric machine and that is electrically connected to the at least one coil conductor end of the coil conductor in the arrangement according to claim 1.

7. A motor vehicle comprising the electric machine according to claim 6.

8. A method for providing a contact element for an electric machine, the method comprising:
manufacturing generatively and embedding at least in regions, in an electrically insulating material:
at least one contact sleeve, into which a coil conductor end of the electric machine can be inserted and which can be welded to the coil conductor end, and
at least one strip conductor that electrically contacts the contact sleeve,
wherein the coil conductor end has a first taper that is formed by a pyramid vertex of its free end, and
wherein an insertion opening of the at least one contact sleeve has a second taper in the direction of insertion.

\* \* \* \* \*